United States Patent [19]
Uwabo et al.

[11] Patent Number: 6,018,440
[45] Date of Patent: Jan. 25, 2000

[54] FLEXIBLE DISK DRIVE HAVING A POSITION DETECTION UNIT FOR DETECTING A CURRENT POSITION OF A MAGNETIC HEAD

[75] Inventors: Tsuneo Uwabo, Hachiouji; Yoshihiro Okano; Eiichi Yoneyama, both of Atsugi; Yoshinori Tangi, Hachiouji, all of Japan

[73] Assignee: Mitsumi Electric Co., Ltd., Tokyo, Japan

[21] Appl. No.: 08/993,272

[22] Filed: Dec. 18, 1997

[30] Foreign Application Priority Data

Dec. 26, 1996 [JP] Japan ..................... 8-348902

[51] Int. Cl.⁷ .................. G11B 5/55; G11B 5/596
[52] U.S. Cl. ..................... 360/106; 360/78.11
[58] Field of Search ..................... 360/105, 106, 360/78.11–78.13, 77.03; 369/44.28

[56] References Cited

U.S. PATENT DOCUMENTS

| | | | |
|---|---|---|---|
| 4,992,893 | 2/1991 | Kanai et al. | 360/78.13 |
| 5,177,648 | 1/1993 | Inoue | 360/75 |
| 5,270,886 | 12/1993 | Nigam | 360/78.05 |
| 5,305,159 | 4/1994 | Sakai et al. | 360/77.02 |
| 5,587,852 | 12/1996 | Yoshiura et al. | 360/78.12 |

*Primary Examiner*—Brian E. Miller
*Attorney, Agent, or Firm*—Frishauf, Holtz, Goodman, Langer & Chick, P.C.

[57] ABSTRACT

In a position detection unit having a scale and a photointerrupter and using in a magnetic disk drive, the scale has a plurality of slits which are equally spaced along a direction in parallel with a predetermined radial direction and a clipped section which is clipped out of the scale. The photointerrupter has a first light-emitting section and a first light-receiving section which are opposed to each other with the slits put therebetween. The photointerrupter has a second light-emitting section and a second light-receiving section which are opposed to each other at a position corresponding to the clipped section. The scale is mounted on a carriage at a side opposed to a main surface of a main frame. The carriage supports a magnetic head of the magnetic disk drive. And the photointerrupter is mounted on a substrate located close to the main frame.

8 Claims, 5 Drawing Sheets

FLEXIBLE DISK DRIVE HAVING A POSITION DETECTION UNIT FOR DETECTING A CURRENT POSITION OF A MAGNETIC HEAD

BACKGROUND OF THE INVENTION

This invention relates to a flexible disk drive and, in particular, to a position detection unit for use in the positioning of a carriage for supporting a magnetic head and for use in aligning itself.

As is well known in the art, a flexible or floppy disk drive (which may be abbreviated "FDD") of the type described is a device for carrying out data recording and reproducing operation to and from a magnetic disk medium of a flexible or floppy disk (which may be abbreviated to "FD") which has been loaded therein. The flexible disk drive is one of the disk-exchangeable type of magnetic disk drives because the flexible disk to be loaded therein is exchangeable. In recent years, FDs have been significantly improved to have a greater storage capacity. Specifically, development has been made of FDs which have a storage capacity of 128 Mbytes (which may be called large-capacity FDs) in contrast with the FDs having storage capacity of 1 Mbyte or 2 Mbytes (which may be called small-capacity FDs). Following such development, the FDDs have also improved so that they also accept the large-capacity FDs for data recording and reproducing operations to and from the magnetic disk media of the large-capacity FDs.

Throughout the present specification, FDDs capable of recording/reproducing data for magnetic disk media of the large-capacity FDs alone will be referred to as high-density exclusive type FDDS. On the other hand, FDDs capable of recording/reproducing data for magnetic disk media of the small-capacity FDs alone will be called low-density exclusive type FDDs. Furthermore, FDDs capable of recording/reproducing data for magnetic disk media of both the large-capacity and the small-capacity FDs will be called high-density/low-density compatible type FDDs. In addition, the high-density exclusive type FDDs and the high-density/low-density compatible type FDDs may collectively be called high-density type FDDs.

A main difference on mechanism between the low-density exclusive type FDD and the high-density type FDD is a structure of a driving arrangement for moving a carriage supporting a magnetic head along a predetermined radial direction for the magnetic disk medium of the FD loaded in the FDD. More specifically, the low-density exclusive type FDD uses a stepping motor as the drive arrangement. On the other hand, the high-density type FDD uses a linear motor such as a voice coil motor (which may be abbreviated to "VCM") as the drive arrangement.

Now, description will be made in detail as regards the voice coil motor used as the drive arrangement in the high-density type FDD. The voice coil motor comprises a voice coil and a magnetic circuit. The voice coil is disposed on the carriage at a rear side and is wound around a drive axis extending in parallel to the predetermined radial direction. The magnetic circuit generates a magnetic field in a direction intersecting that of an electric current flowing through the voice coil. With this structure, by causing the electric current to flow through the voice coil in a direction intersecting that of the magnetic field generated by the magnetic circuit, a drive force occurs in a direction extending to the drive axis on the basis of interaction of the electric current with the magnetic field. The drive force causes the voice coil motor to move the carriage in the predetermined radial direction.

As well known in the art, the FD includes a magnetic disk medium accessed by a magnetic head. The magnetic disk medium has a plurality of tracks for recording data in the form of concentric circles. As a matter of course, the large-capacity FD is smaller than the small-capacity FD in track width and/or track pitch. The tracks include the most radially outer circumference track (which is named "Tr00") and the most radially inner circumference track. The most radially outer circumference track Tr00 is herein called the most end track. The small-capacity FD has eighty tracks from the most radially outer circumference track Tr00 to the most radially inner circumference track Tr 79 at one side.

It is necessary to position the magnetic head at a desired track position in a case where the FD is accessed by the magnetic head in the FDD. For this purpose, the carriage for supporting the magnetic head must be positioned.

In the low-density exclusive type FDD using the stepping motor as the driving arrangement, it is possible to easily carry out the positioning of the carriage. This is because the stepping motor makes the carriage move step by step in response to pulses applied thereto in the low-density exclusive type FDD. Accordingly, it is unnecessary for the low-density exclusive type FDD to be provided with any exclusive positioning arrangement apart from the stepping motor.

On the other hand, in the high-density/low-density compatible type FDD using the linear motor as the driving arrangement, it is necessary to be provided with the exclusive positioning arrangement for positioning the carriage in a case that the low-density FD is loaded in the high-density/low-density compatible type FDD. This is because the linear motor makes the carriage freely move along the predetermined radial direction on the basis of current flowing in the coil and it is therefore necessary to carry out any control to stop the free movement of the carriage. In order to position the carriage, it must be provided with a position detection unit for detecting a current position of the carriage or the magnetic head and a control unit for controlling the position of the carriage on the basis of the current position detected by the position detection unit.

By the way, it is unnecessary to use the position detection unit in a case that the high-density FD is loaded in the high-density/low-density compatible type FDD. This is because the high-density FD has servo control data which is recorded on the magnetic disk medium thereof.

In addition, it is necessary to detect the position corresponding to the most radially outer circumference track Tr00 of the magnetic disk medium in a case that the low-density FD is loaded in each of the low-density exclusive type FDD and the high-density/low-density compatible type FDD. Moreover, it is necessary to adjust a position (or alignment) of the position detection unit when each of the low-density exclusive type FDD and the high-density/low-density compatible type FDD is assembled. The alignment adjustment is called off-track adjustment in this field.

The off-track adjustment is carried out by the use of an adjusting medium which is called an alignment disk. The alignment disk has a most radially outer circumference track Tr00, a most radially inner circumference track Tr 79, and an alignment adjusting track that standard signals are recorded on, respectively. The alignment adjusting track is halfway between the most radially outer circumference track Tr00 and the most radially inner circumference track Tr 79. Generally, a track Tr40 is selected and used as the alignment adjusting track.

A position detection unit is proposed by Applicants in U.S. patent application Ser. No. 08/792,986. The proposed position detection unit comprises a scale mounted on a carriage for supporting a magnetic head and a photointerrupter mounted on a substrate located close to a main frame. The position detection unit detects both a carriage position representative of a position of the carriage and a most end position corresponding to a most radially outer circumference track of a magnetic disk medium loaded in a flexible disk drive.

Referring to FIG. 1, a scale for use in a position detection unit proposed by Applicants in U.S. patent application Ser. No. 08/792,986 will be described in order to facilitate an understanding of the invention.

The scale 31' has a plurality of light transmission/shield elements 311 which are equally spaced along a direction in parallel with a predetermined radial direction B of a magnetic disk medium of a flexible or floppy disk (FD) loaded in a magnetic disk drive (FDD). In the example being illustrated, the scale 31' is made of an opaque member. The light transmission/shield elements 311 are slits bored through the scale 31'. The light transmission/shield elements 311 are used for detecting a position of a carriage which supports a magnetic head of the FDD. The scale 31' has an additional light transmission/shield element 312' which is an opening window bored through the scale 31' at a lower side. The additional light transmission/shield element 312' is used for detecting a most outer circuit circumference track Tr00 of the magnetic disk.

The scale 31' is used for off-track adjustment together with a photointerrupter. However, the off-track adjustment takes a long time because the scale is of no use to detect an alignment adjusting track of an alignment disk which is used for the off-track adjustment.

The scale has a plurality of slits for detecting the carriage position and a notch for detecting the most end position. The slits are spaced along a direction in parallel with a predetermined radial direction. The photointerrupter has a light-emitting unit and a light-receiving unit which are arranged opposite to each other so that the scale is interposed with spaces between the light-emitting unit and the light-receiving unit. The light-emitting unit has first and second light-emitting sections corresponding to the slits and the notch, respectively. Similarly, the light-receiving unit has first and second light-receiving sections corresponding to the slits and the notch, respectively.

Off-track adjustment is carried out to be attached to the flexible disk drive as follows. First, the photointerrupter is temporarily placed on the substrate and the scale is fixed to the carriage. In this situation, the carriage is moved along the radial direction to detect the standard signal recorded on the most radially outer circumference track Tr00 by the use of the magnetic head. Then, the photointerrupter is adjusted in position and is temporarily fixed on the substrate so as to detect the most end position by the use of the scale in a state that the magnetic head detects the standard signal recorded on the most radially outer circumference track Tr00. Next, the carriage is moved toward an inner circumference side along the radial direction to detect the standard signal recorded on the alignment adjusting track Tr40 by the use of the magnetic head. If the carriage position detected by the photo-interrupter is different from an actual position of the carriage when the magnetic head detects the standard signal recorded on the alignment adjusting track Tr40, the photo-interrupter is adjusted in position again so that the carriage position coincides with the alignment adjusting track Tr40.

The position detection unit is available for the off-track adjustment as mentioned above. However, it takes a long time for the magnetic head to detect the alignment adjusting track Tr40 even though the position detection unit is used for the off-track adjustment. This complicates assembly of the flexible disk drive.

SUMMARY OF THE INVENTION

It is therefore an object of this invention to provide a position detection unit which is easily attached to a flexible disk drive in a short time.

It is another object of this invention to provide a flexible disk drive with a position detection unit of the type described.

It is still another object of this invention to provide a position detection unit that an off track adjustment can be easily carried out.

Other objects of this invention will become clear as the description proceeds.

On describing the present invention, it is possible to be understood that a position detection unit is used in a magnetic disk drive to detect a current position of a magnetic head which is used for recording/reproducing data to/from a magnetic disk medium loaded in the magnetic disk drive. The magnetic disk drive has a main frame having a main surface, a carriage for supporting the magnetic head with a space left between the carriage and the main surface of the main frame, a linear motor for moving the carriage along a predetermined radial direction, and a substrate located close to the main frame.

According to an aspect of this invention, the above-understood position detection unit comprises a scale which is mounted on the carriage at a side opposed to the main surface of the main frame. The scale extends along both of a direction in parallel with the predetermined radial direction and a plane perpendicular to the main surface of the main frame. The scale has a plurality of first light transmission/shield elements which are equally spaced along the direction in parallel with the predetermined radial direction and which are used for detecting a current position of the carriage and has a second light transmission/shield element to detect positions according to both of a most radially outer circumference track and an alignment adjusting track of the magnetic disk medium. A photointerrupter is mounted on the substrate and includes a light-emitting unit and a light-receiving unit which are opposed to each other with the scale put therebetween. The light-emitting unit has a first light-emitting section which is located at a position corresponding to the first light transmission/shield elements and a second light-emitting section which is located at a position corresponding to the second light transmission/shield element. The light-receiving unit has a first light-receiving section which is located at a position corresponding to the first light transmission/shield elements and a second light-receiving section which is located at a position corresponding to the second light transmission/shield element.

In the above-understood position detection unit, the scale is an opaque member. The first light transmission/shield elements may be slits bored through the scale. The second light transmission/shield element may be clipped section clipped out of the scale. The second light transmission/shield element may be projection section projected from the scale.

DESCRIPTION OF THE PREFERRED EMBODIMENTS

Figure 2:
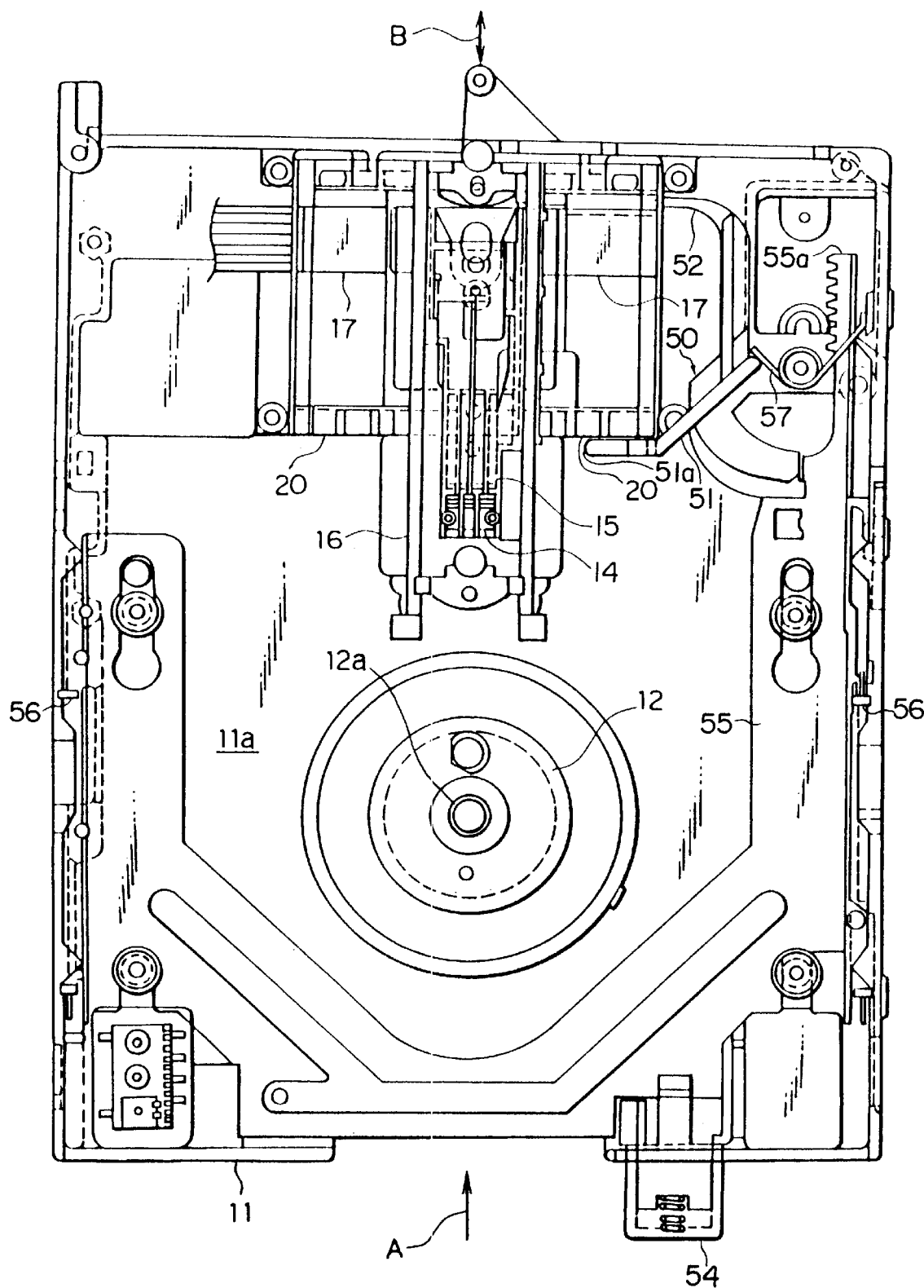
FIG. 2 is a plane view of a magnetic disk drive comprising a position detection unit comprising a position detection unit according to a preferred embodiment of this invention.

Referring to FIG. 2, description will proceed to an FDD comprising a position detection unit according to a preferred embodiment of this invention. The illustrated FDD is a drive unit for carrying out recording/reproducing of data for the magnetic disk medium of the FD (not shown). The FD is loaded into the FDD from a loading direction indicated by an arrow A in FIG. 2. FIG. 2 shows a state where the FD is loaded into the FDD. The FD has a disk center axis.

The FDD comprises a main frame 11 having a main surface 11a and a disk table assembly 12 which is rotatably supported on the main surface 11a of the main frame 11. The disk table assembly 12 has an assembly center axis 12a. The loaded FD is held on the disk table assembly 12 so that the assembly center axis 12a coincides with the disk center axis. The disk table assembly 12 is rotatably driven by a drive motor (not shown), which is mounted on the main frame 11, thereby the magnetic disk medium in the FD rotates. In addition, the main frame 11 has a back surface (not shown) on which a printed-circuit board (not shown) is attached. A number of electronic parts (not shown) are mounted on the printed-circuit board.

In the manner which will become clear later, the FDD comprises a pair of magnetic heads for reading/writing data from/to the magnetic disk medium in the FD. The magnetic heads are supported via gimbals 14 with the carriage 15. A combination of the magnetic heads, the gimbals 14, the carriage 15 is called a carriage assembly. The carriage 15 is disposed over the main surface 11a of the main frame 11 with a space left therebetween. The carriage 15 supports the magnetic heads movably along the predetermined radial direction (i.e. the direction indicated by an arrow B in FIG. 2) to the FD.

The carriage 15 is supported and guided at both lower sides thereof by a pair of guide bars 16 which extend to directions in parallel with the predetermined radial direction B.

The carriage 15 is driven along the predetermined radial direction B by a voice coil motor which will later be described. More specifically, the voice coil motor comprises a pair of voice coils 17 and a pair of magnetic circuits 20. The voice coils 17 are disposed on the carriage 15 at a rear side and are wound around driving axes in parallel with the predetermined radial direction B. The magnetic circuits 20 generate magnetic fields which intersect currents flowing in the voice coils 17. With this structure, by causing the currents to flow in the voice coils 17 in directions where the magnetic fields generated by the magnetic circuits 20 intersect, driving force occurs along the predetermined radial direction B extending to the driving axes on the basis of interaction between the currents and the magnetic fields. The driving force causes the voice coil motor to move the carriage 15 along the predetermined radial direction B.

The FD has a shutter (not shown). The FDD includes a shutter drive mechanism for controlling the opening and closing of the shutter of the FD, an ejector mechanism for ejecting the FD, and a carriage lock mechanism for locking the carriage 15 on and after completion of ejection operation.

The FDD includes a lever unit 50 which comprises an ejection lever 51 and a lock lever 52. The ejection lever 51 has a tip 51a. The ejection lever 51 serves as both of a component of the shutter drive mechanism and another component of the ejector mechanism. The lock lever 52 is disposed in the vicinity of the carriage 15 and is operable as a component of the carriage lock mechanism.

The ejector mechanism comprises an ejection push button 54, an ejection plate 55, and a pair of ejection springs 56. More specifically, the FDD includes a front panel (not shown) at a front end thereof. The front panel has a reception opening (not shown) for receiving the FD. The FDD further includes a disk holder unit (not shown) for holding the FD loaded into the FDD. The ejection push button 54 projects into an outer surface of the front panel. The ejection plate 55 locates the FD loaded from the reception opening with the ejection plate opposed to one surface of the FD. Each ejection spring 56 has an end engaged with the ejection plate 55 and another end engaged with the disk holder unit. In addition, the ejection plate 55 is provided with a rack 55a at an end thereof in a depth direction. The rack 55a engages with a pinion (not shown) which is rotatably supported on the main surface 11a of the main frame 11. The lever unit 50 is energized counterclockwise by a spring member 57.

It is presumed that the FD is loaded into the FDD. In other words, the FD is forced into the FDD along the loading direction indicated by the arrow A in FIG. 2. In this event, the tip 51a of the ejection lever 51 is engaged with a right-hand upper end of the shutter. With movement of the FD, the lever unit 50 rotates in a clockwise direction. As a result, the tip 51a of the ejection lever 51 opens the shutter.

It is assumed that the FD is completely housed in the FDD. Under the circumstances, the FD is held in the disk holder unit by a disk lock mechanism (not shown).

Figure 3A:
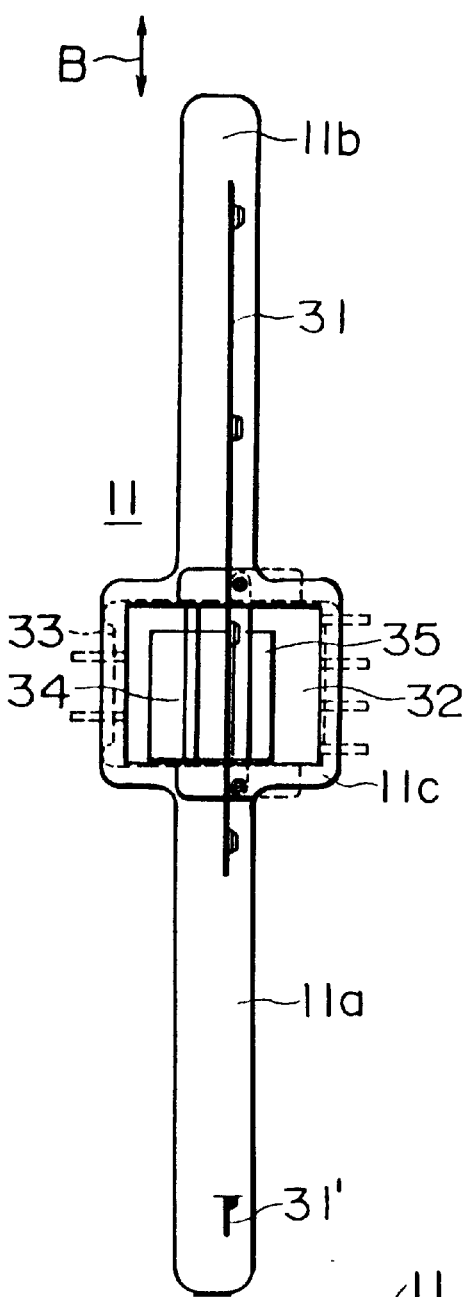
FIGS. 3a through 3c collectively show the position detection unit according to the preferred embodiment of this invention.
Figure 3B:
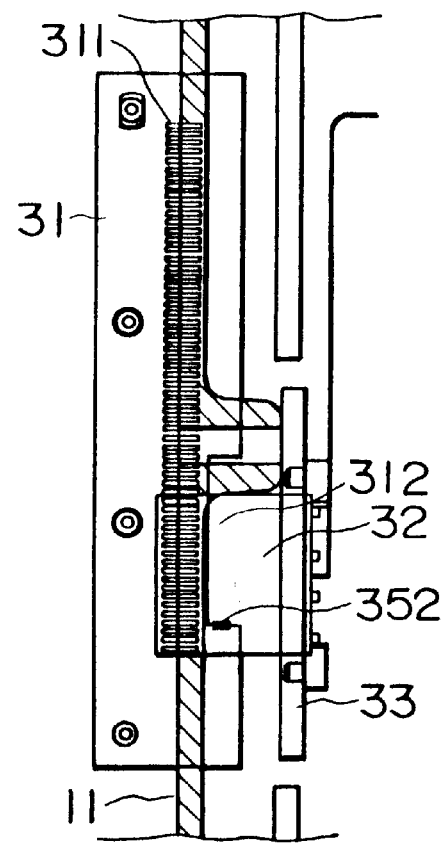
Figure 3C:
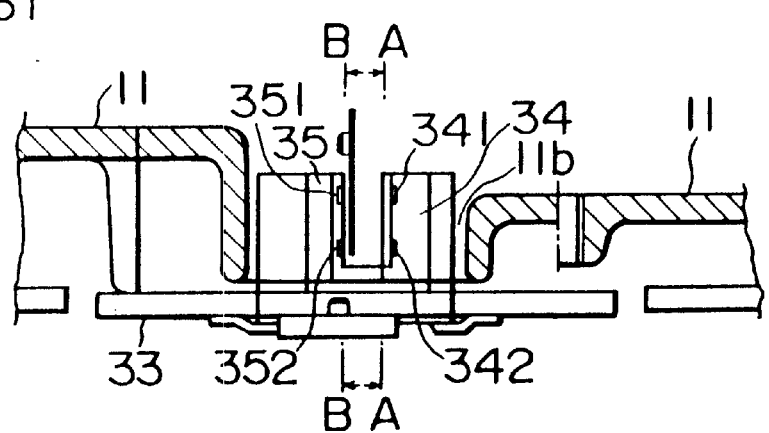

Turning to FIGS. 3A through 3C, the description will proceed to the position detection unit according to the preferred embodiment of this invention. FIGS. 3A through 3C are a plan view, a right-hand side view, and a rear sectional view, respectively.

The illustrated position detection unit comprises a scale 31 and a photointerrupter 32. The scale 31 is mounted on the carriage (not shown) at a side opposed to the main surface 11a of the main frame 11. The photointerrupter 32 is mounted on a substrate 33 which is mounted on the main frame 11 at a bottom side. The scale 31 extends along both of a direction in parallel with the predetermined radial direction B and a plane perpendicular to the main surface 11a of the main frame 11. The illustrated scale 31 is made of an opaque member.

Figure 1:
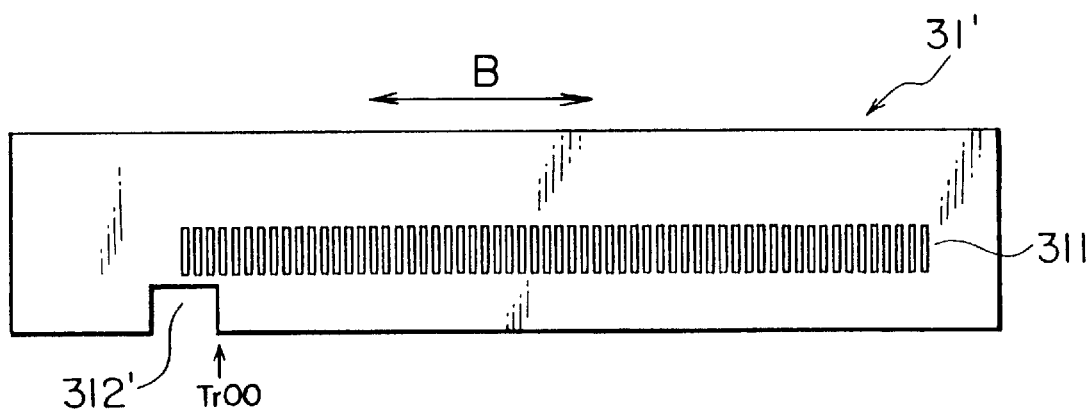
FIG. 1 is a side view of a scale for use in a position detection unit proposed by Applicants in U.S. patent application Ser. No. 8/792,986.
Figure 4:
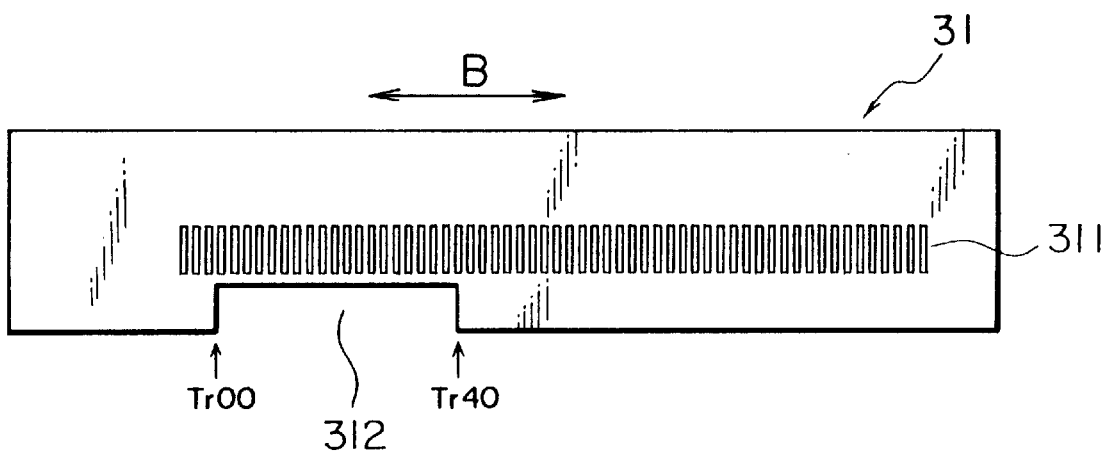
FIG. 4 shows a scale for use in the position detection unit illustrated in FIGS. 3a through 3c.

Referring to FIG. 4 in addition to FIG. 3B, the scale 31 has a plurality of light transmission/shield elements 311 which are equally spaced along the direction in parallel with the predetermined radial direction B and has an additional light transmission/shield element 312 for use in detecting positions corresponding to both of the most end track Tr00 in the magnetic disk medium of the FD and the alignment adjusting track (for example, Tr00) of the alignment disk. In the example being illustrated, the light transmission/shield elements 311 are slits bored through the scale 31 and the additional light transmission/shield element 312 is a clipped section clipped out of the scale 31 at a lower end from the position corresponding to the most end track Tr00 to the position corresponding to the alignment adjusting track Tr40. The scale 31 is made of stainless steel having a thickness of 0.05 to 0.03 mm and the slits 311 are formed by etching. Inasmuch as the magnetic disk medium of the small capacity FD has eighty tracks at one side which are concentric with one another, the number of the slits 311 must be equal to the number so as to cover a movable range for the carriage 15. In the example being illustrated, the slits 311 are equal in number to sixty.

Figure 5:
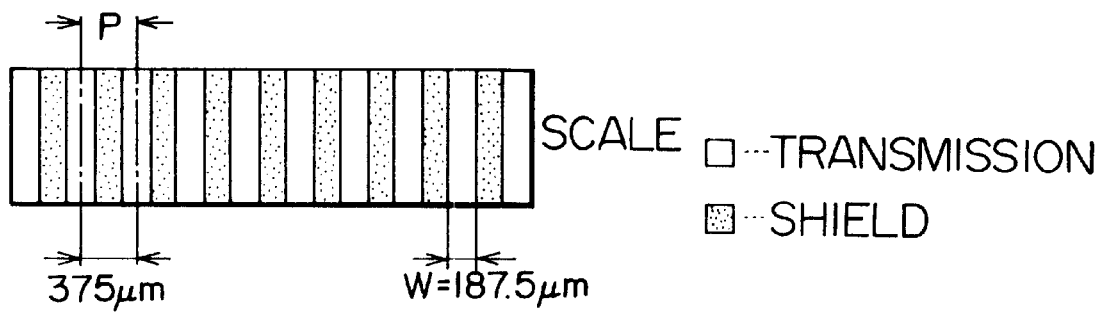
FIG. 5 is a enlarged view of a first light transmission/shield elements of the scale illustrated in FIG. 4.

FIG. 5 shows a slit interval of a slit pitch of the slits 311. As well known in the art, the small capacity FD has a track pitch of 187.5 μm. As a result, each slit 311 has a width W of 187.5 μm and the slit interval or the slit pitch P of the slits 311 is equal to 375 μm which is twice the track pitch.

Turning back to FIG. 3A, the main frame 11 has an opening section 11b for allowing a bottom portion of the scale 31 to pass therethrough and an additional opening section 11c for allowing a head portion of the photointerrupter 32 to insert therein. That is, the bottom portion of the scale is inserted in the opening section 11b. The head portion of the photointerrupter 32 is freely inserted in the additional opening section 11c. In other words, the opening section 11b allows the scale 31 to move in the direction in parallel with the predetermined radial direction B. The additional opening section 11c allows the photointerrupter 32 to move in the direction in parallel with the predetermined radial direction B. It is therefore possible to carry out alignment for the photointerrupter 32. As shown in FIG. 3C, the illustrated additional opening section 11c is a hole having a size larger than that of the head portion of the photointerrupter 32 so as to allow the photointerrupter 32 move not only in the direction in parallel with the predetermined radial direction B but also in a direction perpendicular to the predetermined radial direction B.

FIGS. 3A and 3B shows a state that the magnetic heads supported by the carriage 15 are positioned on the most end track Tr00 of the magnetic disk medium of the FD. The scale 31 may move from this position to a position depicted at 31' where the magnetic heads 13 are positioned on the most inner circumferential track Tr79 in the magnetic disk medium of the FD.

As shown in FIG. 3C, the photointerrupter 32 includes a light-emitting unit 34 and a light-receiving unit 35 which are opposed to each other with the scale 31 put therebetween.

Figure 6A:
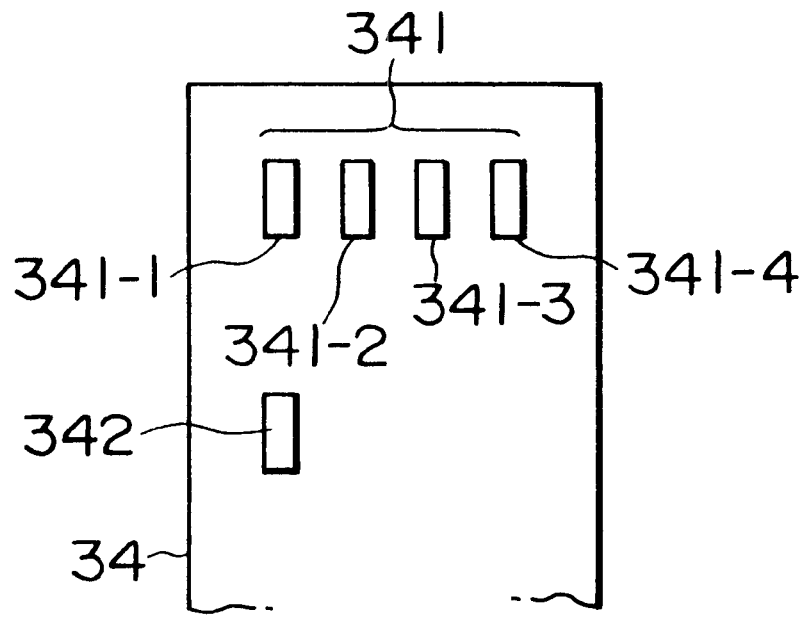
FIGS. 6a and 6b show a light-emitting unit and a light-receiving unit for use in the position detection unit illustrated in FIGS. 3a through 3c, respectively.
Figure 6B:
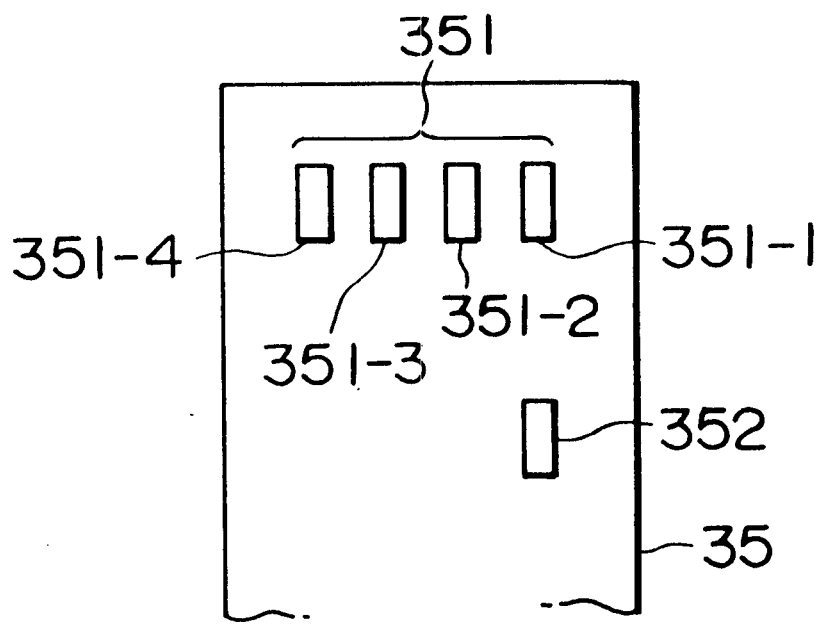

Referring to FIGS. 6A and 6B in addition to FIG. 3C, the light-emitting unit 34 comprises a light-emitting section 341 and an additional light-emitting section 342 as shown in FIG. 6A while the light-receiving unit 35 comprises a light-receiving section 351 and an additional light-receiving section 352 as shown in FIG. 6B. The light-emitting section 341 and the light-receiving section 351 are opposed to each other with the slits 311 put therebetween. The additional light-emitting section 342 and the additional light-receiving section 352 are opposed to each other at a position corresponding to the clipped section 312.

In the example being illustrated, the light-emitting section 341 consists of first through fourth light-emitting elements 341-1, 341-2, 341-3, and 341-4. The light-receiving section 351 consists of first through fourth light-receiving elements 351-1, 351-2, 351-3, and 351-4 which are opposed to the first through the fourth light-emitting elements 341-1 to 341-4, respectively. The first through the fourth light-receiving elements 351-1 to 351-4 are located in phase 90° apart along the direction in parallel with the predetermined radial direction B. In addition, the light-emitting section 341 may consist of only one light-emitting element.

Figure 7:
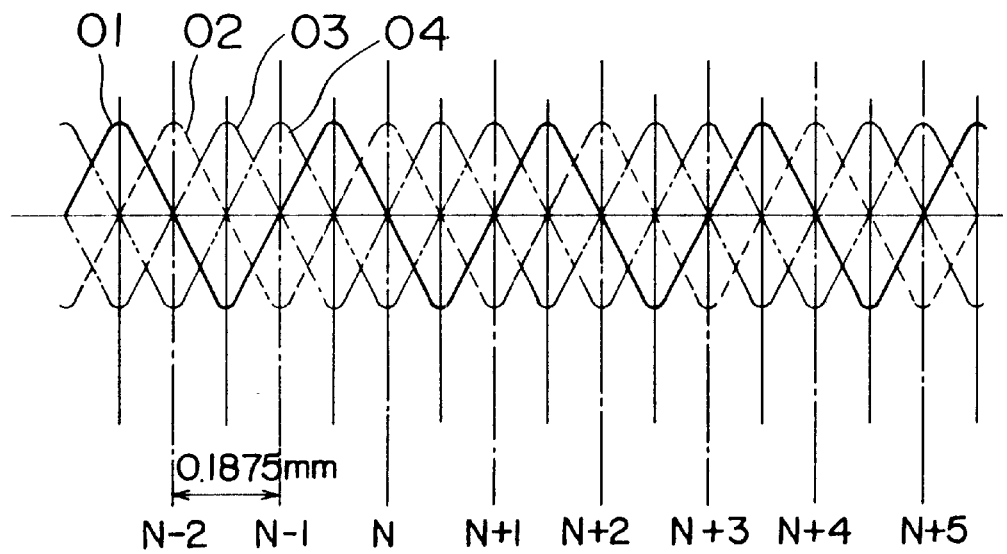
FIG. 7 shows relationship between track positions and output signals of the light-receiving unit illustrated in FIG. 6b.

FIG. 7 shows relationship between track positions (carriage positions) and output signals of the first through the fourth light-receiving elements 351-1 to 351-4. In FIG. 7, a top or first line (a) indicates the output signals 01 to 04 outputted from the first through the fourth light-receiving elements 351-1 to 351-4 and a second line (b) indicates the track positions (the carriage positions) by numerals N–2 through N+5. As apparent from FIG. 6 (a), the output signals 01 to 04 outputted from the first through the fourth light-receiving elements 351-1 to 351-4 have phase differences of 90°. As a result, it is possible to detect a direction of movement of the carriage 15 (FIG. 2).

At any rate, in the above-mentioned position detection unit, the light beam emitted by the light-emitting section 341 of the photointerrupter 32 is received by the light-receiving section 351 through the slits 311 of the scale 31. Accordingly, it is possible to determine the current position of the carriage 15 or the magnetic heads by counting presence/absence of reception of the light beam in the light-receiving section 351 of the photointerrupter 32.

Moreover, a combination of the additional light-emitting section 342 and the additional light-receiving section 352 detects presence/absence of the additional light transmission/shield element or the clipped section 312 to determine the position of the most end track Tr00 in the magnetic disk medium of the small capacity FD inserted into the FDD and to determine the position of the alignment adjusting track Tr40 in the alignment disk inserted into the FDD. In the example being illustrated, as shown in FIG. 3B, the position of the most end track Tr00 in the magnetic disk medium of the small capacity FD is a first transition point which shifts from a state where the additional light-receiving section 352 can not receive a light beam from the additional light-emitting section 342 to another state where the additional light-receiving section 352 receives the light beam from the additional light-emitting section 342 through the clipped section 312 by movement of the carriage 15 at an inner radial side in the small capacity FD (i.e. when one edge of the clipped section 312 corresponding to the transition point is detected). The position of the alignment adjusting track Tr40 in the alignment disk is a second transition point which shifts from the state where the additional light-receiving section 352 receives a light beam from the additional light-emitting section 342 through the clipped section 312 to the state where the additional light-receiving section 352 cannot receive the light beam from the additional light-emitting section 342 by movement of the carriage 15 at an inner radial side in the alignment disk (i.e. when the other edge of the clipped section 312 corresponding to the other transition point is detected).

Therefore, the position detection unit can detect the position of the alignment adjusting track Tr40 of the alignment disk. Accordingly, the off-track adjustment can be easily carried out in a short time by the use of the position detection unit. In addition, the position detection unit is inexpensive because it is implemented by a few parts and serves all of a carriage position detection unit, a most end track detection unit, and an alignment adjusting track detection unit.

Figure 8:
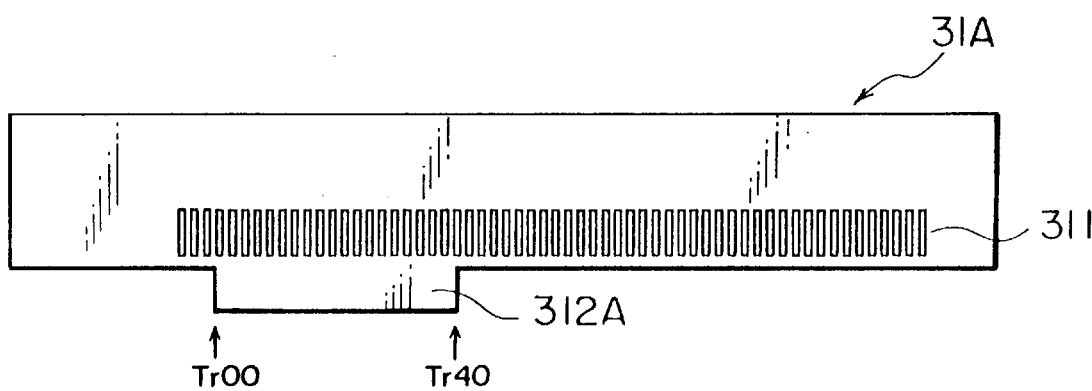
FIG. 8 shows another scale for use in the position detection unit illustrated in FIGS. 3a through 3c.

While this invention has thus far been described in conjunction with the preferred embodiment thereof, it will now be readily possible for those skilled in the art to put this invention into various other manners. For example, the position detection unit according to this invention may be applied to other various magnetic recording/reproducing units of the type in which the carriage is driven by the linear motor as well as the high density type FDD. The additional light transmission/shield element 312 may be an opening window bored through the scale 31 at a lower side of the scale 31 in place of the clipped section. In addition, the additional light transmission/shield element 312 may be a projection section projecting out of the scale 31 in a downward direction in place of the clipped section as shown in FIG. 8. The scale may be made of a transparent member although the scale is made of the opaque member in the above-mentioned embodiment. In this event, as the light transmission/shield elements may be used thin pieces made of opaque material that are stuck on the scale. In addition, as the additional light transmission/shield element may be used a tape-shaped piece made of opaque material that are stuck on the scale. Without restriction to the above-mentioned ones, various types of light transmission/shield elements or additional light transmission/shield elements may be used.

What is claimed is:

1. A position detection unit for use in a magnetic disk drive to detect a current position of a magnetic head which is used for recording/reproducing data to/from a magnetic disk medium loaded in said magnetic disk drive, said magnetic disk drive having a main frame having a main surface, a carriage for supporting said magnetic head with a space left between said carriage and the main surface of said main frame, a linear motor for moving said carriage along a predetermined radial direction, and a substrate mounted on said main frame, said position detection unit comprising:

a scale mounted on said carriage at a side opposed to the main surface of said main frame, said scale extending along both of a direction in parallel with said predetermined radial direction and a plane perpendicular to the main surface of said main frame, said scale having a plurality of first light transmission/shield elements which are equally spaced along the direction in parallel with the predetermined radial direction and which are used for detecting a current position of the carriage, and said scale having a second light transmission/shield element which is positioned to detect both of a most outer circumference track and an alignment adjusting track of the magnetic disk medium; and a photointerrupter mounted on said substrate and including a light-emitting unit and a light-receiving unit which are opposed to each other with said scale put therebetween, said light-emitting unit having a first light-emitting section located at a position corresponding to the first light transmission/shield elements and a second light-emitting section located at a position corresponding to the second light transmission/shield element, and said light-receiving unit having a first light-receiving section located at a position corresponding to the first light transmission/shield elements and a second light-receiving section located at a position corresponding to the second light transmission/shield element.

2. A position detection unit as claimed in claim 1, said scale being made of an opaque member, wherein said first light transmission/shield elements comprise slits bored through the scale.

3. A position detection unit as claimed in claim 1, said scale being made of an opaque member, wherein said second light transmission/shield element comprises a clipped section clipped out of the scale at a lower end from a position corresponding to the most outer circumference track to a position corresponding to the alignment adjusting track.

4. A position detection unit as claimed in claim 1, said scale being made of an opaque member, wherein said second light transmission/shield element comprises a projection section projecting out of said scale at a lower end from a position corresponding to the most outer circumference track to a position corresponding to the alignment adjusting track in a downward direction.

5. A magnetic disk drive for driving a magnetic disk medium inserted thereinto, comprising:

a main frame having a main surface;

a magnetic head for reading/writing data from/to said magnetic disk medium;

a carriage for supporting said magnetic head with a space left between said carriage and the main surface of said main frame;

a linear motor for moving said carriage along a predetermined radial direction;

a substrate mounted on said main frame; and a position detection unit for detecting a current position of said magnetic head, said detection unit comprising:

a scale mounted on said carriage at a side opposed to the main surface of said main frame, said scale extending along both of a direction in parallel with said predetermined radial direction and a plane perpendicular to the main surface of said main frame, said scale having a plurality of first light transmission/shield elements which are equally spaced along the direction in parallel with the predetermined radial direction and which are used for detecting a position of said carriage, and said scale having a second light transmission/shield element which is positioned to detect both of a most outer circumference track and an alignment adjusting track of the magnetic disk medium; and a photointerrupter mounted on said substrate and including a light-emitting unit and a light-receiving unit which are opposed to each other with said scale put therebetween, said light-emitting unit having a first light-emitting section located at a position corresponding to the first light transmission/shield elements and a second light-emitting section located at a position corresponding to the second light transmission/shield element, and said light-receiving unit having a first light-receiving section located at a position corresponding to the first light transmission/shield elements and a second light-receiving section located at a position corresponding to the second light transmission/shield element.

6. A magnetic disk drive as claimed in claim 5, said scale being made of an opaque member, wherein said first light transmission/shield elements comprise slits bored through the scale.

7. A position detection unit as claimed in claim 5, said scale being made of an opaque member, wherein said second light transmission/shield element comprises a clipped section clipped out of the scale at a lower end from a position corresponding to the most outer circumference track to a position corresponding to the alignment adjusting track.

8. A position detection unit as claimed in claim 5, said scale being made of an opaque member, wherein said second light transmission/shield element comprises a projection section projecting out of said scale at a lower end from a position corresponding to the most outer circumference track to a position corresponding to the alignment adjusting track in a downward direction.

* * * * *